US010594862B2

(12) United States Patent
Cudak et al.

(10) Patent No.: US 10,594,862 B2
(45) **Date of Patent: *Mar. 17, 2020**

(54) CONTEXTUAL CONTACT SUBSTITUTION FOR MOBILE DEVICES

(71) Applicant: LENOVO ENTERPRISE SOLUTIONS (SINGAPORE) PTE. LTD., New Tech Park (SG)

(72) Inventors: Gary D. Cudak, Wake Forest, NC (US); Christopher J. Hardee, Raleigh, NC (US); Sarbajit K. Rakshit, Kolkata (IN); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,124

(22) Filed: Feb. 26, 2019

(65) Prior Publication Data

US 2019/0199856 A1 Jun. 27, 2019

Related U.S. Application Data

(63) Continuation of application No. 14/561,150, filed on Dec. 4, 2014, now Pat. No. 10,218,843.

(51) Int. Cl.

*H04M 3/42* (2006.01)
*H04M 1/725* (2006.01)

(Continued)

(52) U.S. Cl.

CPC ... *H04M 3/42357* (2013.01); *H04M 3/42263* (2013.01); *H04M 1/72566* (2013.01);

(Continued)

(58) Field of Classification Search

CPC ......... H04M 3/42059; H04M 3/42068; H04M 3/42348; H04M 3/4211; H04M 3/54;

(Continued)

(56) References Cited

U.S. PATENT DOCUMENTS 7,072,457 B2 * 7/2006 Brown .................. H04M 3/436 379/115.01
8,781,094 B2 * 7/2014 Ramanathan ..... H04M 3/42374 379/201.01

(Continued)

*Primary Examiner* — Olumide Ajibade Akonai
(74) *Attorney, Agent, or Firm* — Jeffrey L. Streets

(57) ABSTRACT

Embodiments of the present invention provide a method, system and computer program product for context sensitive contact substitution for mobile communications. In an embodiment of the invention, a method for context sensitive contact substitution for mobile communications includes selecting a contact disposed within a list of contacts in memory of a mobile computing device for use in establishing a telephone call with the selected contact through the mobile computing device. The method also includes determining a context of the telephone call and identifying in the list of contacts an alternate contact to the selected contact based upon the determined context. In this regard, the context may be a location of the mobile computing device, or a time of day of establishing the telephone call, to name two examples. Finally, the method includes establishing the telephone call through the mobile computing device with the alternate contact instead of the selected contact.

9 Claims, 1 Drawing Sheet

(51) Int. Cl.
*H04M 3/54* (2006.01)
*H04M 3/493* (2006.01)
*H04W 4/02* (2018.01)

(52) U.S. Cl.
CPC ............ *H04M 3/4931* (2013.01); *H04M 3/54* (2013.01); *H04W 4/02* (2013.01)

(58) Field of Classification Search
CPC ........... H04M 2203/551; H04M 3/382; H04M 3/436; H04M 2242/30; H04M 3/42093; H04M 3/42102; H04M 3/42042; H04L 65/1069; H04L 29/12122; H04W 8/18; H04W 40/00; H04W 40/38; H04W 76/10; H04W 4/029; H04W 12/00503; H04W 4/90
See application file for complete search history.

(56) References Cited

U.S. PATENT DOCUMENTS 10,218,843 B2 * 2/2019 Cudak ............... H04M 3/42357
2006/0056612 A1 * 3/2006 Ju ..................... H04M 3/42059 379/201.01
2009/0086947 A1 * 4/2009 Vendrow ................. H04M 3/02 379/201.12
2015/0181041 A1 * 6/2015 Elkington ........... H04M 3/5235 379/265.13

* cited by examiner

CONTEXTUAL CONTACT SUBSTITUTION FOR MOBILE DEVICES

CROSS-REFERENCE TO RELATED APPLICATIONS

This application is a Continuation of U.S. patent application Ser. No. 14/561,150, filed Dec. 4, 2014, the entirety of which is incorporated herein by reference.

BACKGROUND OF THE INVENTION

Field of the Invention

The present invention relates to contact management in a computing device and more particularly to contact utilization in communications.

Description of the Related Art

The address book has remained part and parcel of mobile telephony since the inception of the cellular network. The address book of a mobile phone is a data store of contacts including names and telephone numbers of those known to the possessor of the mobile phone. Often referred to as a contact list, mobile phones traditionally provide both a general list of contacts and also a "speed dial" list of most frequently accessed contacts. More advanced smart phones additionally provide the capability to filter contacts in a contact list, for example in order of most frequently contacted or most recently contacted.

Oftentimes, different contacts in a list fulfill an interchangeable role such that when one contact of a role is to be reached telephonically, in the event that the contact of the role cannot be reached, reaching an alternative contact of the same role can be a satisfactory outcome. At present, the manner in which contacts of a role can be reached is best termed a brute force method. Specifically, one typically begins with an attempt to telephone a first contact of the role and continues through the list until a contact of the role is reached. To the extent that the first or second contact can be reached, the brute force method can suffice. However, where the first available and reachable contact of a role resides four or more entries deep in a contact list filtered by role, the manually intensive brute force method can be extraordinarily wasteful.

When selecting a contact for communication that enjoys an interchangeable role with other contacts, the context of the communication can be of importance. For example, when seeking to dial a restaurant to order food, the location of the mobile device ought to determine which restaurant to select for dialing. Likewise, when calling for medical attention, the hour of the phone call should determine whether or not to dial the regular phone number of a doctor, or perhaps an after-hours number. Knowing which phone number to select based upon the context is largely a manual exercise wholly dependent on the ad hoc thinking of the end user.

BRIEF SUMMARY OF THE INVENTION

Embodiments of the present invention address deficiencies of the art in respect to contact selection in mobile communications and provide a novel and non-obvious method, system and computer program product for context sensitive contact substitution for mobile communications. In an embodiment of the invention, a method for context sensitive contact substitution for mobile communications includes selecting a contact disposed within a list of contacts in memory of a mobile computing device for use in establishing a telephone call with the selected contact through the mobile computing device. The method also includes determining a context of the telephone call and identifying in the list of contacts an alternate contact to the selected contact based upon the determined context. In this regard, the context may be a location of the mobile computing device, or a time of day of establishing the telephone call, to name two examples. Finally, the method includes establishing the telephone call through the mobile computing device with the alternate contact instead of the selected contact.

In one aspect of the embodiment, the telephone call is established with the alternate contact instead of the selected contact only if the selected contact has been flagged in the list of contacts as permitting an alternate contact, but otherwise establishing the telephone call with the selected contact. In another aspect of the embodiment, the alternate contact is selected based upon auxiliary information stored in the list of contacts in connection with the selected which is common to the alternate contact. In even another aspect of the embodiment, the alternate contact may be selected based upon a machine learned pattern recognizing a correlation between telephone calls established with different contacts and a proximity of the mobile computing device to those of different contacts with whom the telephone calls are established.

In another embodiment of the invention, a mobile computing data processing system is configured for context sensitive contact substitution for mobile communications. The system includes a mobile computing device that has at least one processor and memory. The system also includes a list of contacts stored in the memory. The system yet further includes a phone dialer application executing in the memory of the mobile computing device. Finally, the system includes a context sensitive contact substitution module coupled to the phone dialer. The module includes program code enabled upon execution in the memory to select a contact disposed within the list of contacts for use in establishing a telephone call with the selected contact by the phone dialer, to determine a context of the telephone call, to identify in the list of contacts an alternate contact to the selected contact based upon the determined context and to establish the telephone call through the phone dialer with the alternate contact instead of the selected contact.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for context sensitive contact substitution for mobile communications. In accordance with an embodiment of the invention, a contact can be selected in memory of a mobile device for use in establishing communications through the mobile device. A context of the communications can be determined, for instance a location of the mobile device or a time of day of the selection of the contact. Thereafter, an alternate contact for the selected contact can be determined based upon the context. Finally, the communications can be established not with the selected contact, but with the alternate contact.

Figure 1:
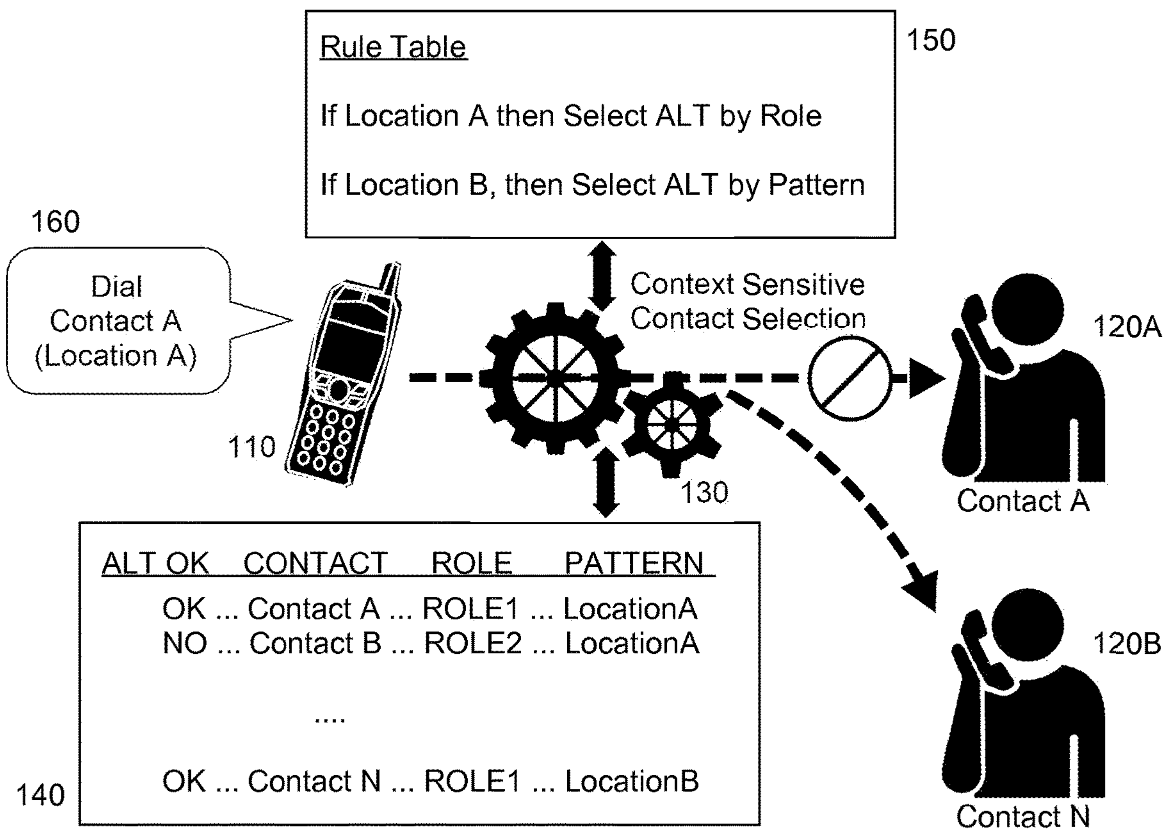
FIG. 1 is a pictorial illustration of a process for context sensitive contact substitution for mobile communications.

In further illustration, FIG. 1 pictorially shows a process for context sensitive contact substitution for mobile communications. As shown in FIG. 1, a dial directive 160 can be received in a mobile computing device 110. The dial directive 160 can indicate a selected contact 120A to be dialed by the mobile computing device 110 so as to establish communications with the selected contact 120A. The dial directive 160 also can specify a context for the dialing of the selected contact 120A, for instance a contemporaneous location of the mobile computing device 110, or a time of day of the dialing of the selected contact 120A.

Context sensitive contact selection logic 130 can process the dial directive 160 to determine in a list of contacts 140 whether or not an alternative contact 120B is permitted for the selected contact 120A. In this regard, the list of contacts 140 can include not only a listing of each different contact in the list 140, but also the list of contacts 140 includes for each contact an indication of a role for the contact such as a type of business or a type of service performed, a past pattern of contact such as a location from where a last communication with a corresponding contact occurred, and an indication of whether or not an alternate contact is permitted to be dialed in lieu of dialing the corresponding contact.

To the extent that it is determined by the context sensitive contact selection logic 130 that an alternate contact 120B may be dialed in lieu of the selected contact 120A in the dial directive 160, the context sensitive contact selection logic 130 can further determine whether or not the context of the dial directive 160 provides for the dialing of an alternate contact 120B in lieu of the selected contact 120A based upon the application of a rule in a rules table 150. Each rule in the rules table 150 can specify that for a given context of a dialing directive, an alternate contact is to be selected based auxiliary information in the list of contacts 140, such as a common role, or a common pattern. Thereafter, if permitted by a record in the list of contacts 140 for the selected contact 120A, the context sensitive contact selection logic 130 can direct a phone dialer of the mobile computing device 110 to dial an alternate contact 120B for the selected contact 120A specified by a pertinent one of the rules of the rule table 150.

Figure 2:
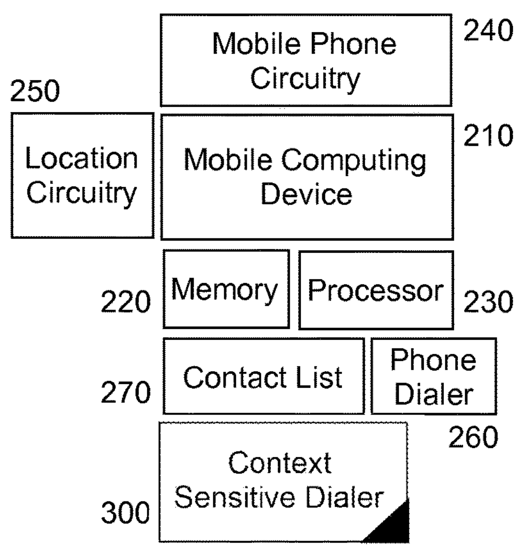
FIG. 2 is a schematic illustration of a mobile computing data processing system configured for context sensitive contact substitution for mobile communications; and, FIG. 3 is a flow chart illustrating a process for context sensitive contact substitution for mobile communications.

The process described in connection with FIG. 1 can be implemented in a mobile computing data processing system. In further illustration, FIG. 2 schematically shows a mobile computing data processing system configured for context sensitive contact substitution for mobile communications. The system includes a mobile computing device 210 that includes memory 220 and at least one processor 230. Location circuitry 250 also can be provided, such as a global positioning system (GPS) enabled to determine a contemporaneous location of the mobile computing device 210 and to provide a determined location in the memory 220 of the mobile computing device 210.

Mobile phone circuitry 240 can be included within the system and coupled to the mobile computing device 210. In this regard, the mobile phone circuitry can be adapted to establish telephonic communications with other telephonic devices in part over a public switched telephone network (PSTN). As such, a phone dialer 260 can execute in the memory 220 of the mobile computing device so as to manage the dialing of telephone numbers for contacts in a contact list 270 in the memory 220 of the mobile computing device 210 by the mobile phone circuitry 240.

Of note, a context sensitive contact selection module 300 can be coupled to the phone dialer 260. The module 300 can include program code that when executed in the memory 220 of the mobile computing device 210, is enabled to detect a selection of a contact in the contact list 270 for dialing by the phone dialer 260. The program code also is enabled to determine a context of the selection of the contact for dialing by the phone dialer 260 so as to establish a telephone call with the selected contact by the mobile phone circuitry 240. The program code further can be enabled to identify an alternate contact for the selected contact based upon the context. Finally, the program code can be enabled to direct the phone dialer 260 to establish a telephone call not with the selected contact, but with the alternate contact.

Figure 3:
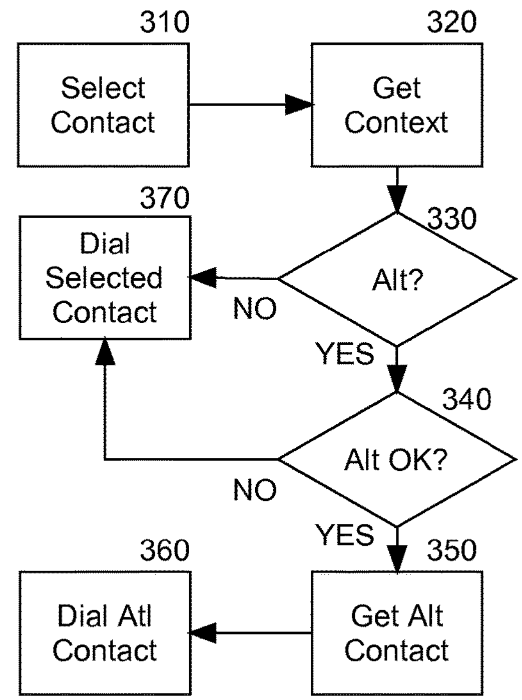

In even yet further illustration of the context sensitive contact selection module 300, FIG. 3 is a flow chart illustrating a process for context sensitive contact substitution for mobile communications. Beginning in block 310, a contact can be selected for dialing in a contact list of a mobile computing device. In block 320, a context for dialing the selected contact can be determined, for example a contemporaneous location of the mobile computing device, or a time of day of dialing the selected contact. In decision block 330, it can be determined whether or not an alternate contact may be dialed in lieu of the selected contact based upon the context. If not, the selected contact can be dialed in block 370. Otherwise, in decision block 340 it further can be determined if the selected contact permits the dialing of the alternate contact in lieu of the selected contact. If so, the alternate contact can be determined based upon the context and in block 360 the alternate contact can be dialed in lieu of the selected contact.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for context sensitive contact substitution for mobile communications, the method comprising:

selecting a contact disposed within a list of contacts in memory of a mobile computing device for use in establishing a telephone call with the selected contact through the mobile computing device;

determining a location of the mobile computing device used in establishing the telephone call;

locating in a rule table a rule corresponding to the determined location;

applying the located rule in order to identify in the list of contacts an alternate contact to the selected contact based upon the determined location and a machine learned pattern that correlates telephone calls previously established with ones of the different contacts with a proximity of the mobile computing device to those of different contacts with whom telephone calls previously had been established; and establishing the telephone call through the mobile computing device with the alternate contact instead of the selected contact.

2. The method of claim 1, wherein the telephone call is established with the alternate contact instead of the selected contact only if the selected contact has been flagged in the list of contacts as permitting an alternate contact, but otherwise establishing the telephone call with the selected contact.

3. The method of claim 1, wherein the alternate contact is selected based upon auxiliary information stored in the list of contacts in connection with the selected which is common to the alternate contact.

4. A mobile computing data processing system configured for context sensitive contact substitution for mobile communications, the system comprising:

a mobile computing device comprising at least one processor and memory;

a list of contacts stored in the memory;

a phone dialer application executing in the memory of the mobile computing device; and, a context sensitive contact substitution module coupled to the phone dialer, the module comprising program code enabled upon execution in the memory to select a contact disposed within the list of contacts for use in establishing a telephone call with the selected contact by the phone dialer, to determine a location of the mobile computing device used in establishing the telephone call, to locate in a rule table a rule corresponding to the determined location, to apply the located rule in order to identify in the list of contacts an alternate contact to the selected contact based upon the determined location and a machine learned pattern that correlates telephone calls previously established with ones of the different contacts with a proximity of the mobile computing device to those of different contacts with whom telephone calls previously had been established, and to establish the telephone call through the phone dialer with the alternate contact instead of the selected contact.

5. The system of claim 4, wherein the telephone call is established with the alternate contact instead of the selected contact only if the selected contact has been flagged in the list of contacts as permitting an alternate contact, but otherwise establishing the telephone call with the selected contact.

6. The system of claim 4, wherein the alternate contact is selected based upon auxiliary information stored in the list of contacts in connection with the selected which is common to the alternate contact.

7. A computer program product for context sensitive contact substitution for mobile communications, the computer program product comprising a computer readable storage medium having program instructions embodied therewith, the program instructions executable by a device to cause the device to perform a method comprising:

selecting by the device a contact disposed within a list of contacts for use in establishing a telephone call with the selected contact through the device;

determining by the device a location of the mobile computing device used in establishing the telephone call;

locating in a rule table a rule corresponding to the determined location;

applying the located rule in order to identify by the device in the list of contacts an alternate contact to the selected contact based upon the determined location and a machine learned pattern that correlates telephone calls previously established with ones of the different contacts with a proximity of the mobile computing device to those of different contacts with whom telephone calls previously had been established; and establishing by the device the telephone call through the mobile computing device with the alternate contact instead of the selected contact.

8. The computer program product of claim 7, wherein the telephone call is established with the alternate contact instead of the selected contact only if the selected contact has been flagged in the list of contacts as permitting an alternate contact, but otherwise establishing the telephone call with the selected contact.

9. The computer program product of claim 7, wherein the alternate contact is selected based upon auxiliary information stored in the list of contacts in connection with the selected which is common to the alternate contact.

* * * * *